(No Model.)
D. W. SMITH.
FEED WATER HEATER.
No. 387,320. Patented Aug. 7, 1888.
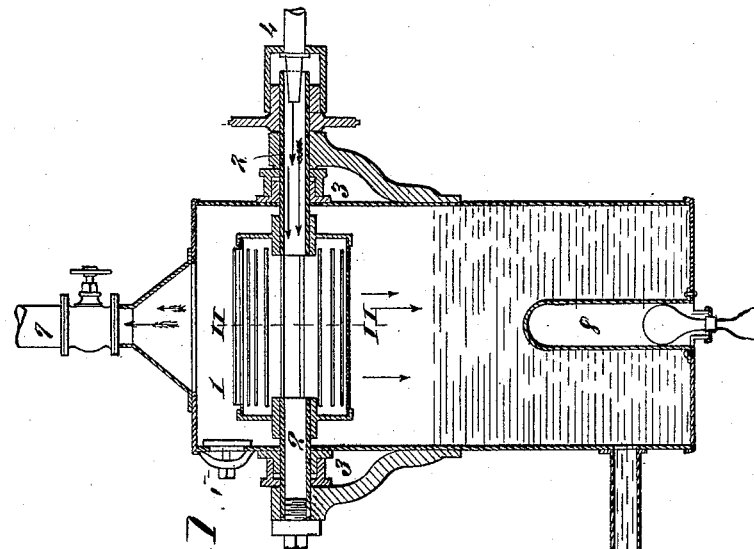
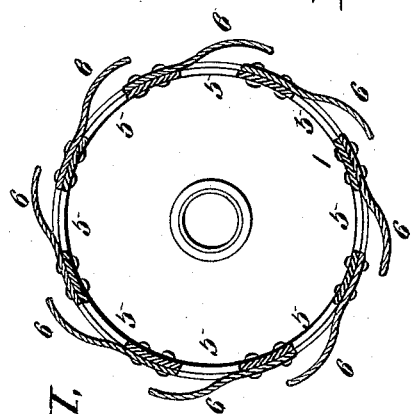
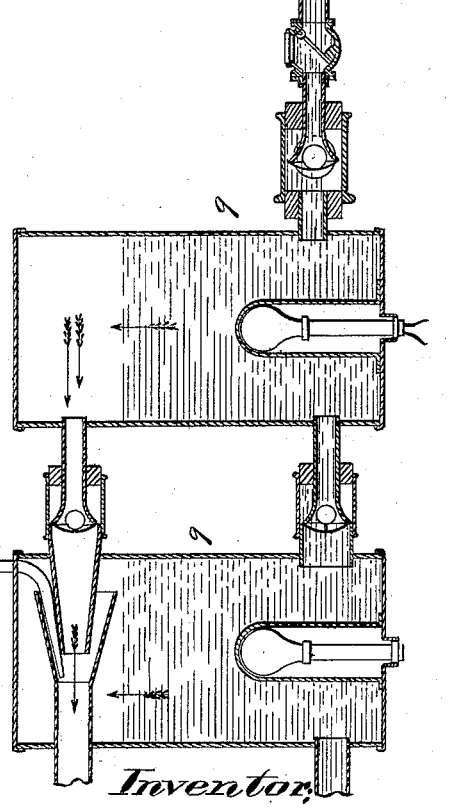
Attest:
E. Arthur.
E. M. Bentley.
Inventor,
Daniel W. Smith
By Knight Bros
Atty's

UNITED STATES PATENT OFFICE.

DANIEL W. SMITH, OF ST. LOUIS, MISSOURI, ASSIGNOR OF ONE-HALF TO JOSEPH C. ADDINGTON, OF SAME PLACE.

FEED-WATER HEATER.

SPECIFICATION forming part of Letters Patent No. 387,320, dated August 7, 1888.

Application filed November 26, 1887. Serial No. 256,244. (No model.)

*To all whom it may concern:*

Be it known that I, DANIEL W. SMITH, of the city of St. Louis, in the State of Missouri, have invented a certain new and useful Improvement in Feed-Water Heaters for Steam-Generators, of which the following is a full, clear, and exact description, reference being had to the accompanying drawings, forming part of this specification, and in which—

Figure I is a vertical section illustrating my improvement. Fig. II is a transverse section taken on line II II, Fig. I.

My invention relates to an improvement in feed-water heaters for steam-generators, and is particularly adapted to be used in connection with such generators as that shown and described in another application filed herewith by me, Serial No. 256,245.

My invention relates, in this application, to the means for feeding the water to the generator in a spray, such means consisting of a drum, 1, supported on a hollow shaft or spindle, 2, which passes through stuffing-boxes 3. The water from the boiler passes through the hollow shaft or spindle from a pipe, 4. The drum is provided with a number of openings, 5, outside of which are secured curved wings 6, of the shape shown in Fig. II. As the water passes into the drum, it escapes through these openings onto the wings, causing the drum to revolve on the hollow shaft or spindle, and this causes the water to be thrown in sheets or sprays from the drum, so that it falls into the tank of the generater in a spray.

7 represents a pipe through which the steam escapes.

8 represents the heater.

9 represents generators to which the water may pass from the first generator. These generators are shown and described in the application referred to, and need no description here.

I claim as my invention—

1. In a steam-generator, in combination with a tank, a cylinder provided with perforations or holes, wings secured to the periphery of the cylinder opposite the holes, and a hollow shaft or spindle upon which the cylinder is supported, substantially as set forth.

2. In combination with the tank provided with means for heating it, the cylinder 1, having openings 5, curved wings 6, secured to the cylinder opposite the openings, hollow shaft or spindle 2 on which the cylinder is supported, and escape-pipe 7, substantially as and for the purpose set forth.

DANIEL W. SMITH.

In presence of—
 JOS. WAHLE,
 EDWD. S. KNIGHT.